US008976710B2

(12) United States Patent  (10) Patent No.: US 8,976,710 B2
Indukuri et al.  (45) Date of Patent: Mar. 10, 2015

(54) METHODS FOR DISCOVERING AND ANALYZING NETWORK TOPOLOGIES AND DEVICES THEREOF

(75) Inventors: Kishore Varma Indukuri, Tanuku Taluku (IN); Shahanaz Syed, Guntur (IN); Radha Krishna Pisipati, Hyderabad (IN)

(73) Assignee: Infosys Limited, Bangalore (IN)

( * ) Notice: Subject to any disclaimer, the term of this patent is extended or adjusted under 35 U.S.C. 154(b) by 147 days.

(21) Appl. No.: 13/530,791

(22) Filed: Jun. 22, 2012

(65) Prior Publication Data

US 2013/0163471 A1  Jun. 27, 2013

(30) Foreign Application Priority Data

Dec. 27, 2011  (IN) .......................... 4606/CHE/2011

(51) Int. Cl.
*H04L 12/28* (2006.01)
*G06Q 10/00* (2012.01)
*H04L 12/42* (2006.01)
*H04L 12/44* (2006.01)

(52) U.S. Cl.
CPC ................ *G06Q 10/00* (2013.01); *H04L 12/42* (2013.01); *H04L 12/44* (2013.01)
USPC ........................................................ 370/255

(58) Field of Classification Search
None
See application file for complete search history.

(56) References Cited

U.S. PATENT DOCUMENTS

| | | | |
|---|---|---|---|
| 7,349,994 B2 * | 3/2008 | Balonado et al. ............. | 709/250 |
| 7,366,759 B2 | 4/2008 | Trevithick et al. | |
| 7,406,539 B2 * | 7/2008 | Baldonado et al. ............ | 709/240 |
| 7,675,868 B2 * | 3/2010 | Balonado et al. .............. | 370/254 |
| 7,830,820 B2 * | 11/2010 | Duke et al. ..................... | 370/254 |
| 7,840,704 B2 * | 11/2010 | Balonado et al. ............. | 709/241 |
| 7,856,411 B2 | 12/2010 | Darr | |
| 7,916,723 B2 | 3/2011 | Fan et al. | |
| 8,130,947 B2 | 3/2012 | Kerschbaum et al. | |
| 2005/0216300 A1 | 9/2005 | Appelman et al. | |
| 2007/0271272 A1 | 11/2007 | McGuire et al. | |
| 2008/0025223 A1 * | 1/2008 | Karacali-Akyamac et al. ............................. | 370/241 |
| 2008/0070209 A1 | 3/2008 | Zhuang et al. | |
| 2010/0332991 A1 * | 12/2010 | Banerjee et al. .............. | 715/736 |
| 2011/0055379 A1 | 3/2011 | Lin et al. | |
| 2011/0071953 A1 | 3/2011 | Shen et al. | |

(Continued)

FOREIGN PATENT DOCUMENTS

WO  2009077649 A1  6/2009

OTHER PUBLICATIONS

Kerschbaum et al., "Privacy-Preserving Social Network Analysis for Criminal Investigations," WPES '08 Proceedings of the 7th ACM Workshop on Privacy in the Electronic Society, 5 pp. (2008).

(Continued)

*Primary Examiner* — Anh-Vu Ly
(74) *Attorney, Agent, or Firm* — LeClairRyan, a Professional Corporation (57) ABSTRACT

A method, non-transitory computer readable medium, and apparatus for discovering and analyzing a network topology includes obtaining information regarding a network including a relationship of a plurality of nodes of the network. At least one value for each of a plurality of centrality parameters is determined for each of the plurality of nodes. At least one topology score for each of the plurality of nodes is generated based on one or more of the centrality parameter values. One or more relatively significant nodes are identified based on one or more of the topology scores and output.

24 Claims, 9 Drawing Sheets

(56) References Cited

U.S. PATENT DOCUMENTS

2012/0140671 A1* 6/2012 Bukofser et al. ............. 370/253
2013/0085982 A1* 4/2013 Paglieroni et al. ............. 706/52

OTHER PUBLICATIONS

Sharma et al., "Network Dynamics of Scholarship: A Social Network Analysis of Digital Library Community," PIKM '08, Proceedings of the 2nd PhD workshop on Information and knowledge management, pp. 101-104 (2008).
Tang et al., "Analysing Information Flows and Key Mediators through Temporal Centrality Metrics," SNS '10 Proceedings of the 3rd Workshop on Social Network Systems, 6 pp. (2010).
Bader et al., "Parallel Algorithms for Evaluating Centrality Indices in Real-World Networks," ICPP '06 Proceedings of the 2006 International Conference on Parallel Processing, pp. 539-550 (2006).
Banan et al., "What About Correlation Between Metrics and Social Computing?," Georgian Electronic Scientific Journal: Computer Science and Telecommunications, No. 6(27), pp. 47-55 (2009).
Mislove, A.E., "Online Social Networks: Measurement, Analysis, and Applications to Distributed Information Systems," A Thesis Submitted in Partial Fulfillment of the Requirements for the Degree Doctor of Philosophy, Houston, Texas, 268 pp. (Apr. 2009).
Bounova, "Topological Evolution of Networks; Case Studies in the US Airlines and Language Wikipedias," PhD. Theseis, Aeronautics and Astronautics, MIT, 2009.
Chan et al., "Fast Centrality Approximation in Modular Networks," Proc. of the 1st ACM International Workshop on Complex Networks meet Information and Knowledge Management (CNIKM '09), ACM, 2009, pp. 31-38.
Eppstein et al., "Fast Approximation of Centrality," Journal of Graph Algorithms and Applications, vol. 8(1), pp. 39-45 (2004).
Fredman et al., "Fibronacci Heaps and Their Uses in Improved Network Optimization Algorithms," Journal of the ACM, vol. 34(3), pp. 596-615 (1987).
Freeman, L.C., "A Set of Measures of Centrality Based Upon Betweenness," Sociometry, 40:35-41 (1977).
Hwang et al., "Bridging Centrality: Graph Mining from Element Level to Group Level," Proc. of 14th ACM SIGKDD Conference on Knowledge Discovery and Data Mining (KDD-08), pp. 336-344 (2008).
Johnson, D.B., "Efficient Algorithms for Shortest Paths in Sparse Networks," Journal of the ACM, 34(1):1-13 (1977).
Kuramochi et al., "Grew-a Scalable Frequent Subgraph Discovery Algorithm," Proc. of IEEE International Conference on Data Mining (ICDM 2004), IEEE Computr Society, pp. 439-442 (2004).
Lin et al., A Better Strategy of Discovering Link-Pattern Based Asia Knowledge Discovery in Databases (PAKDD 2010), LNCS, Springer 6118(1):56-67 (2010).
Liu et al., "Mining Diversity on Networks," Proc. of Database Systems for Advanced Applications (DASFAA 2010), LNCS, Springer 5981(1):384-398 (2010).
Okamoto et al., "Ranking of Closeness Centrality for Large-Scale Social Networks," Proc. of the 2nd Annual International Workshop on Frontiers in Algorithmics (FAW 2008), LNCS Springer, 5059:186-195 (2008).
Page et al., "The Page Rank Citation Ranking: Bringing Order to the Web," Technocal Report, Stanford University (1998).
Shen et al., "Mobivis: A Visualization System for Exploring Mobile Data," IEEE Pacific Visualization Symposium (PacificVIS-08) pp. 175-182 (2008).
Silva et al., "Structural Correlation Pattern Mining for Large Graphs," Proc. of the English Workshop on Mining and Learning with Graphs (MLG '10), ACM pp. 119-126 (2010).
Yan et al., GSPAN: Graph-Based Substructure Pattern Mining, Proc. of International Conference on Data Mining (ICDM 2011), IEEE Computer Society, p. 721-724 (2002).
Tyna—Help, obtained from http://tyna.gersteinlab.org/tyna/help retrieved on Jun. 22, 2012 (8 pp.).
Anthonisse, J.M., "The Rush in a Directed Graph," Technical Report BN 9/71, Stitching Mathematisch Centrum, Amsterdam, pp. 1-10 (Oct. 1971).
Stephenson et al., "Rethinking Centrality: Methods and Examples," Social Networks, Elsevier, 11(1):1-37 (1989).
Tizghadam et al., "LSP and Back Up Path Setup in MPLS Networks Based on Path Criticality Index," Proc. of IEEE International Conference on Communications (ICC '07), IEEE, pp. 441-448 (2007).
Tizhadam et al., On Congestion in Mission Critical Networks, IEEE INFOCOM 2008, 6 pp. (Apr. 2008).
Wasserman et al., "Social Network Analysis: Methods and Applications," Cambridge: Cambridge University Press, pp. 169-219 (Nov. 1994).
Bounova, "Topological Evolution of Networks; Case Studies in the US Airlines and Language Wikipedias," PhD. Thesis, Aeronautics and Astronautics, MIT, pp. 1-198 (2009).
Brandes, U., "A Faster Algorithm for Betweenness Centrality," Journal of Mathematical Sociology, 25:163-177 (2001).

* cited by examiner

| Node | Total Friends | Star | Ring | Mesh |
|---|---|---|---|---|
| A | 4 | 3.9352 | 112.1649 | 1.4167 |
| B | 4 | 3.9352 | 112.1649 | 1.4167 |
| C | 3 | 0 | 66.1224 | 1.2656 |
| D | 6 | 29.5167 | 227.3684 | 2.25 |
| E | 3 | 0 | 66.1224 | 1.2656 |
| F | 5 | 54.6875 | 111.7021 | 2.4306 |
| G | 5 | 54.6875 | 111.7021 | 2.4306 |
| H | 3 | 70 | 28.4211 | 1.4063 |
| I | 2 | 42 | 24.9505 | 0 |
| J | 1 | 0 | 10.6422 | 0 |

TOPOLOGY SCORES

FIG. 9B

METHODS FOR DISCOVERING AND ANALYZING NETWORK TOPOLOGIES AND DEVICES THEREOF

This application claims the benefit of Indian Patent Application Filing No. 4606/CHE/2011, filed Dec. 27, 2011, which is hereby incorporated by reference in its entirety.

FIELD

This technology generally relates to methods and devices for analyzing network topologies and, more particularly, for efficiently identifying relatively significant nodes based in part on relationships of a plurality of nodes of the network, one or more centrality parameters, and one or more topology scores.

BACKGROUND

Many social networks have become very large and widely used and are increasingly leveraged for information, including characteristics of users, such as for placement of advertising for products or services. Social networks uniquely represent relationships and activities among individuals, communities, and organizations and access to social networks is pervasive in many segments of society as well as available on most computing devices. Accordingly, social networks are generally effective platforms for supporting such advertising.

However, methods for profiling, classifying, and/or modeling social networks, as well as discovering and analyzing topologies represented therein, are often ineffective and/or computationally expensive for very large and/or dynamic networks, requiring traversal of the entire network to analyze each new query regarding network members and/or topologies. Additionally, social network topology analysis often utilizes private or semi-private information, which is not desirable, and/or results in recommendations, such as for placement of advertising, that is uninformed and/or broader than necessary to achieve similar outcomes.

SUMMARY

A method for analyzing a network topology includes obtaining, at a network topology discovery and analyzing computing apparatus, information regarding a network including a relationship of a plurality of nodes of the network. At least one value for each of a plurality of centrality parameters is determined with the network topology discovery and analyzing computing apparatus for each of the plurality of nodes. At least one topology score for each of the plurality of nodes is generated with the network topology discovery and analyzing computing apparatus based on one or more of the centrality parameter values. One or more relatively significant nodes are identified with the network topology discovery and analyzing computing apparatus based on one or more of the topology scores and output.

A non-transitory computer readable medium having stored thereon instructions for analyzing a network topology comprising machine executable code which when executed by at least one processor, causes the processor to perform steps including obtaining information regarding a network including a relationship of a plurality of nodes of the network. At least one value for each of a plurality of centrality parameters is determined for each of the plurality of nodes. At least one topology score for each of the plurality of nodes is generated based on one or more of the centrality parameter values. One or more relatively significant nodes are identified based on one or more of the topology scores and output.

A network topology discovery and analyzing computing apparatus including one or more processors, a memory coupled to the one or more processors which are configured to execute programmed instructions stored in the memory including obtaining information regarding a network including a relationship of a plurality of nodes of the network. At least one value for each of a plurality of centrality parameters is determined for each of the plurality of nodes. At least one topology score for each of the plurality of nodes is generated based on one or more of the centrality parameter values. One or more relatively significant nodes are identified based on one or more of the topology scores and output.

This technology provides a number of advantages including providing more efficient methods, non-transitory computer readable medium, and devices to analyze network topologies to identify characteristics of the network, individual nodes associated with the network, and/or groups or communities present in the network, such as those relatively significant nodes and/or network components. With this technology, a value for each of a plurality of centrality parameters can be determined for each of a plurality of nodes of the network and utilized in the calculation of topology scores which can be used to identify relatively significant nodes, such as likely influencers useful for determining advertising placement, for example. The centrality parameter values can be stored as associated with each node and utilized for other network analysis and/or topology score calculations, without traversing the entire network or reutilizing all of the data representative of the relationships of the nodes of the network. Additionally, the methods and devices do not utilize private or semi-private information regarding each node and, instead, only require information regarding the relationships of the nodes which can be identified based on abstracted unique identifiers.

DETAILED DESCRIPTION

Figure 1:
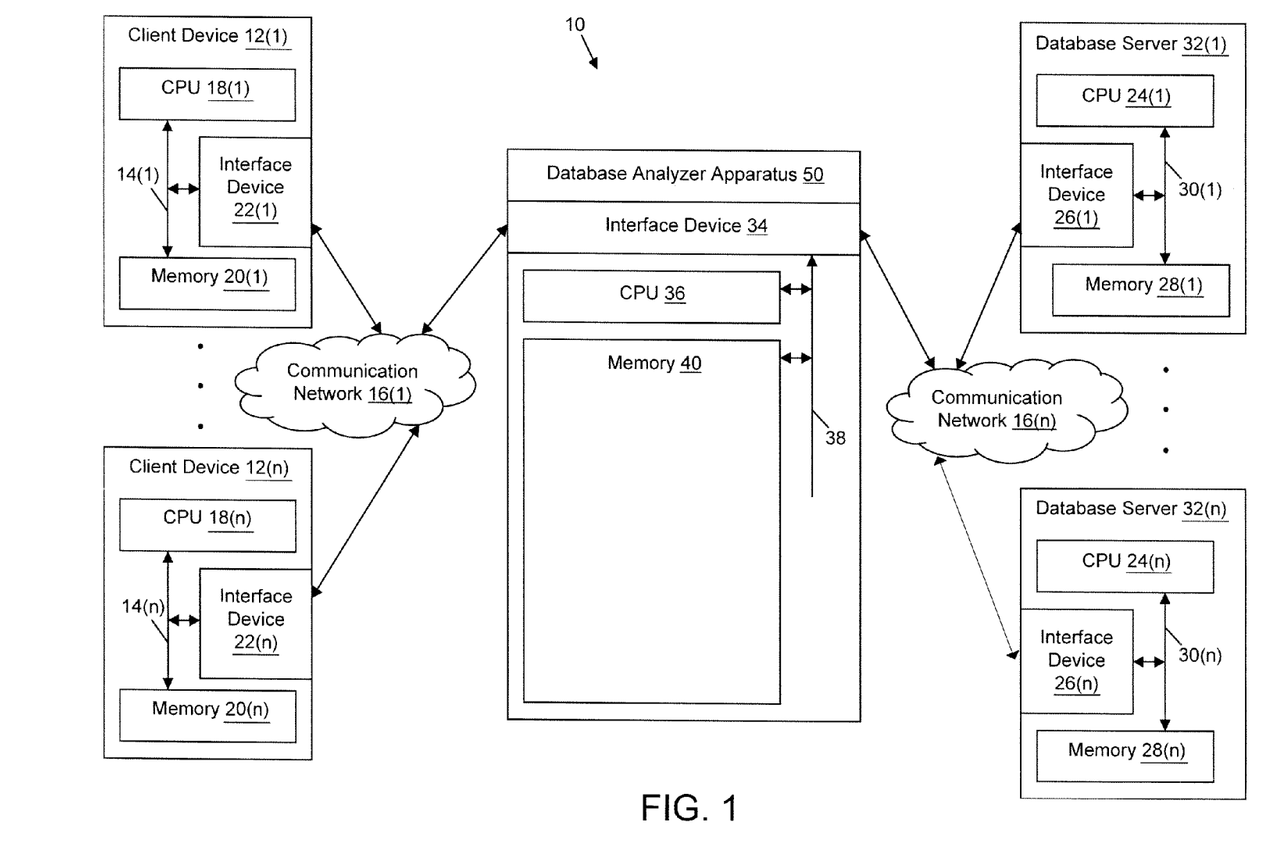
FIG. 1 is an environment with a network topology discovery and analyzing computing apparatus.

An exemplary environment 10 is illustrated in FIG. 1 as including a network topology discovery and analyzing computing apparatus 50, client devices 12(1)-12(n), and database servers 32(1)-32(n) which are coupled together by communications networks 16(1)-16(n) which may include one or more local area networks and/or wide area networks, although other types and numbers of devices and components in other topologies could be used. This technology provides a number of advantages including providing more effective methods, non-transitory computer readable medium, and devices for analyzing network topologies to identify significant nodes, such as those nodes relatively likely to influence one or more other nodes, for business purposes, such as advertising placement by way of example only.

Each client device 12(1)-12(n) in the environment 10 includes a central processing unit (CPU) 18(1)-18(n) or processor, a memory 20(1)-20(n), and an interface 22(1)-22(n) or I/O system, which are coupled together by a bus 14(1)-14(n) or other link, although other numbers and types of devices, elements, and components in other configurations can be included. The client devices 12(1)-12(n) are coupled to the network topology discovery and analyzing computing apparatus 50 by one or more communication networks 16(1) in order to configure and/or retrieve information from the network topology discovery and analyzing computing apparatus 50, for example, although this environment 10 can include other numbers and types of systems, devices, components, and elements in other configurations, such as multiple numbers of each of these apparatuses and devices.

The network topology discovery and analyzing computing apparatus 50 includes at least one CPU 36 including one or more processors, a memory 40, and an interface device 34 which are coupled together by a bus 38 or other link, although other numbers and types of systems, devices, components, and elements in other configurations and locations can be used. The CPU 36 in the network topology discovery and analyzing computing apparatus 50 executes a program of stored instructions for one or more aspects of the present technology as described and illustrated by way of the examples herein, although other types and numbers of processing devices and logic could be used and the CPU 36 could execute other numbers and types of programmed instructions.

The memory 40 in the network topology discovery and analyzing computing apparatus 50 stores these programmed instructions for one or more aspects of the present technology as described and illustrated herein, although some or all of the programmed instructions could be stored and executed elsewhere. A variety of different types of memory storage devices, such as a random access memory (RAM) or a read only memory (ROM) in the apparatus or a floppy disk, hard disk, CD ROM, DVD ROM, or other computer readable medium which is read from and written to by a magnetic, optical, or other reading and writing system that is coupled to the processor 36, can be used for the memory 40.

The interface device 34 in the network topology discovery and analyzing computing apparatus 50 is used to operatively couple and communicate between the network topology discovery and analyzing computing apparatus 50, and the communication network 16(n) coupled to the database servers 32(1)-32(n). By way of example only, the communications could be based on TCP/IP over Ethernet and industry-standard protocols, including NFS, CIFS, SOAP, XML, LDAP, WBEM, WMI, and SNMP, although other types and numbers of connections, each having their own communications protocols, can be used.

The database server 32(1)-32(n) can each include at least one CPU 24(1)-24(n), a memory 28(1)-28(n), and an interface 26(1)-26(n) or I/O system, which are coupled together by a bus 30(1)-30(n) or other link, although other numbers and types of devices, elements, and components in other configurations can be included. The processor 24(1)-24(n) in the database servers 32(1)-32(n) may execute a program of stored instructions for one or more aspects of the present technology as described and illustrated herein. The memory 28(1)-28(n) in the database servers 32(1)-32(n) stores these programmed instructions, although some or all of the programmed instructions could be stored and executed elsewhere. The database servers 32(1)-32(n) can be configured to store network information including relationship information of the plurality of nodes or users of the network, such as a social network by way of example.

It is to be understood that the devices and systems of the examples described herein are for exemplary purposes, as many variations of the specific hardware and software used to implement the examples are possible, as will be appreciated by those skilled in the relevant art(s). Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those ordinary skill in the art.

In addition, two or more computing systems or devices can be substituted for any one of the systems in any embodiment of the examples. Accordingly, principles and advantages of distributed processing, such as redundancy and replication also can be implemented, as desired, to increase the robustness and performance of the devices and systems of the examples. The examples may also be implemented on computer device(s) that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the present technology as described and illustrated by way of the examples herein, as described herein, which when executed by a processor, cause the processor to carry out the steps necessary to implement the methods of the examples, as described and illustrated herein.

An exemplary method for analyzing one or more network topologies will now be described with reference to FIGS. 1-9. In step 200, the network topology discovery and analyzing computing apparatus 50 obtains information regarding a network including a relationship of a plurality of participants of the network. In one example, the relationship information is stored in a database such as a database maintained by database servers 32(1)-32(n). The relationship information can be extracted by the network topology discovery and analyzing computing apparatus 50 directly from the database servers 32(1)-32(n) or obtained from a third party with any uniquely identifying private information concealed. Accordingly, the resulting data set will include a unique identifier for each member of the network, or node, and the relationship of each node to other nodes, if any. In one example, the network is a social network and the relationship information includes, for each member or member profile, an identification the member's friends, followers, and/or associated profiles.

Figure 2:
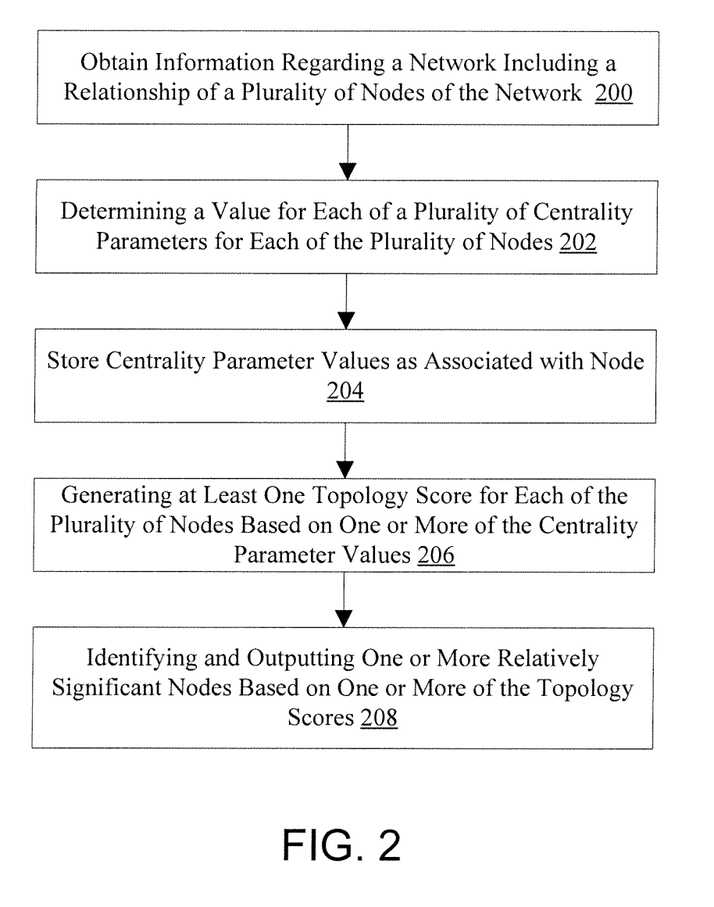
FIG. 2 is a flow chart of an exemplary method for analyzing a network topology.

In step 202, the network topology discovery and analyzing computing apparatus 50 determines at least one value for each of a plurality of centrality parameters for each of the plurality of nodes. The centrality parameters can include one or more of betweenness, closeness, degree, clustering coefficient, or eccentricity, as discussed in more detail below, although other centrality parameters can be utilized including eigenvalue and alpha centrality parameters, for example.

The value of the betweenness centrality parameter (b) for each node of a network is a measure of the number of vertices connecting indirectly to a specified vertex in the network or the extent to which a node lies between other nodes in the network. The betweenness centrality parameter takes into account the connectivity of the node's neighbors, resulting in a higher value for nodes which bridge clusters, communities, and/or groups. The value of the betweenness centrality parameter reflects the number of nodes a node is connecting indirectly through its direct links. Accordingly, the value of the betweenness centrality parameter is increased for nodes that facilitate connectivity among distant nodes of the network. Additionally, a node that resides on many shortest paths when compared to other of the nodes has a higher associated value for the betweenness centrality parameter.

In one example, for a graphical representation of a network $G:=(V,E)$ with n vertices (v) or nodes, the betweenness $b(v)$ for vertex v can be calculated by the following formula: $b(v)=\Sigma_{s \in V, t \in V, s \neq t}(\sigma_{st}(v)/\sigma_{st})$, where $\sigma_{st}$ is the number of shortest paths from s to t, and $\sigma_{st}(v)$ is the number of shortest paths from s to t that pass through vertex v. One exemplary algorithm for determining the value of the betweenness centrality parameter for a plurality of nodes is disclosed in U. Brandes, "A Faster Algorithm for Betweenness Centrality," Journal of Mathematical Sociology, vol. 25 (1994), 2001, pp. 163-177, which is incorporated herein by reference.

Figure 3:
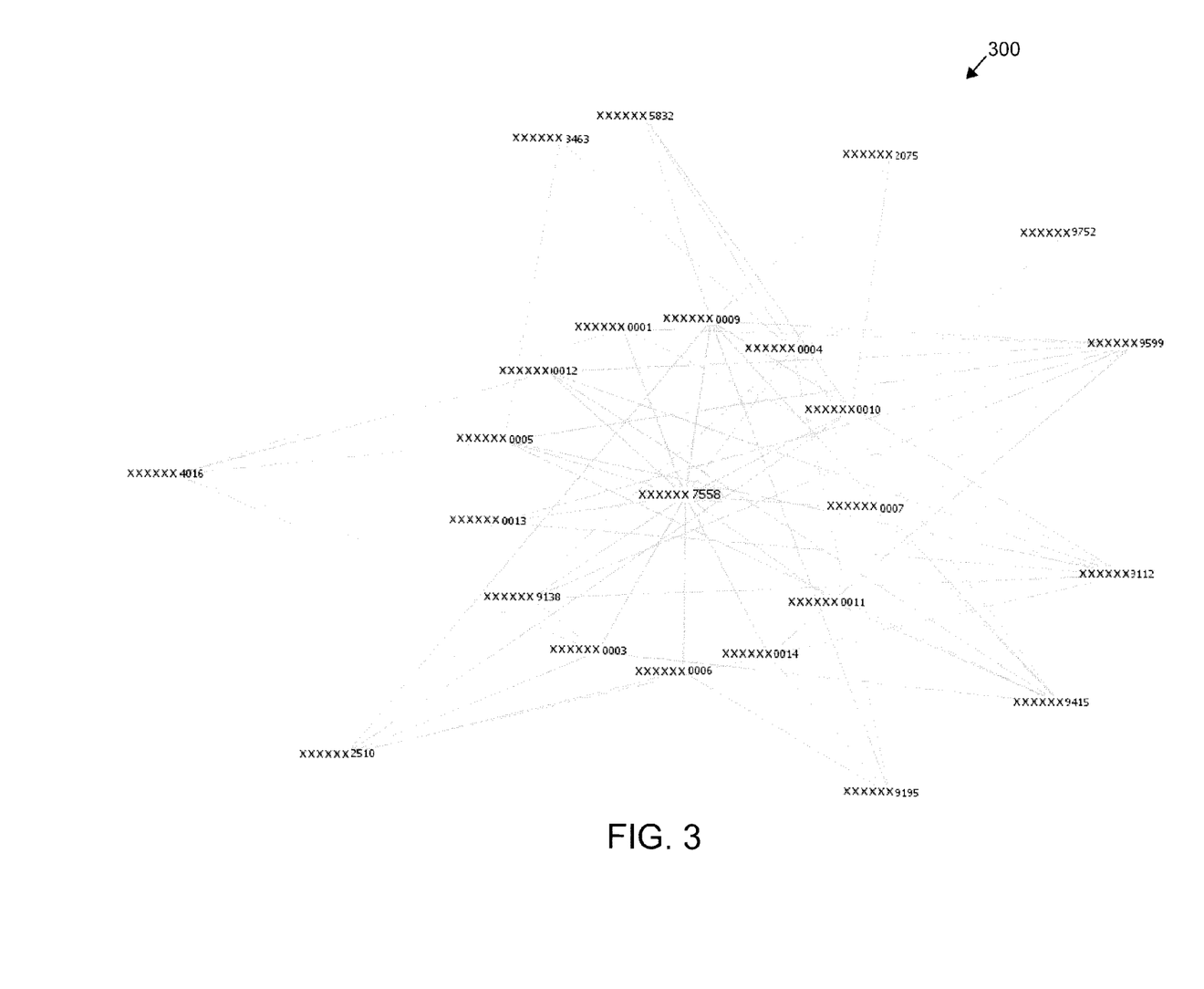
FIG. 3 is an exemplary undirected graph illustrating at least one node with a relatively high associated betweenness centrality parameter value.

Referring to FIG. 3, an exemplary undirected graph 300 representative of a network is shown wherein the XXXXXX7558 node has the highest betweenness centrality parameter value among all the nodes. Accordingly, the XXXXXX7558 node lies in most of the shortest paths between other nodes and the graph 300 forms a star-like network with the XXXXXX7558 node as the hub of the network.

The value of the closeness centrality parameter (cl) for each node of a network is a measure of the efficiency of each node in spreading information to all the other nodes which are reachable in the network or the degree a node is directly or indirectly near all other nodes in a network. The value of the closeness centrality parameter for a node reflects the ability of the node to access information through other network members.

In one example, the value of the closeness centrality parameter for each node of a network is determined as the mean geodesic distance, or the shortest path, between a vertex v or node and all other vertices reachable from it: $cl(v)=((n-1)/\Sigma_{u \in V} d(v,t))$, where d is the size of the network's connectivity component V reachable from v or the cardinality of vertex set V. Exemplary algorithms for determining the value of the closeness centrality parameter for a plurality of nodes are disclosed in S. Y. Chan, I. X. Leung, and P. Li'o, "Fast Centrality Approximation in Modular Networks", Proc. of the 1st ACM International Workshop on Complex Networks meet Information and Knowledge Management (CNIKM '09), ACM, 2009, pp. 31-38 and D. Eppstein and J. Wang, "Fast Approximation of Centrality," Journal of Graph Algorithms and Applications, vol. 8(1), 2004, pp. 39-45, each of which is incorporated herein by reference.

Figure 4:
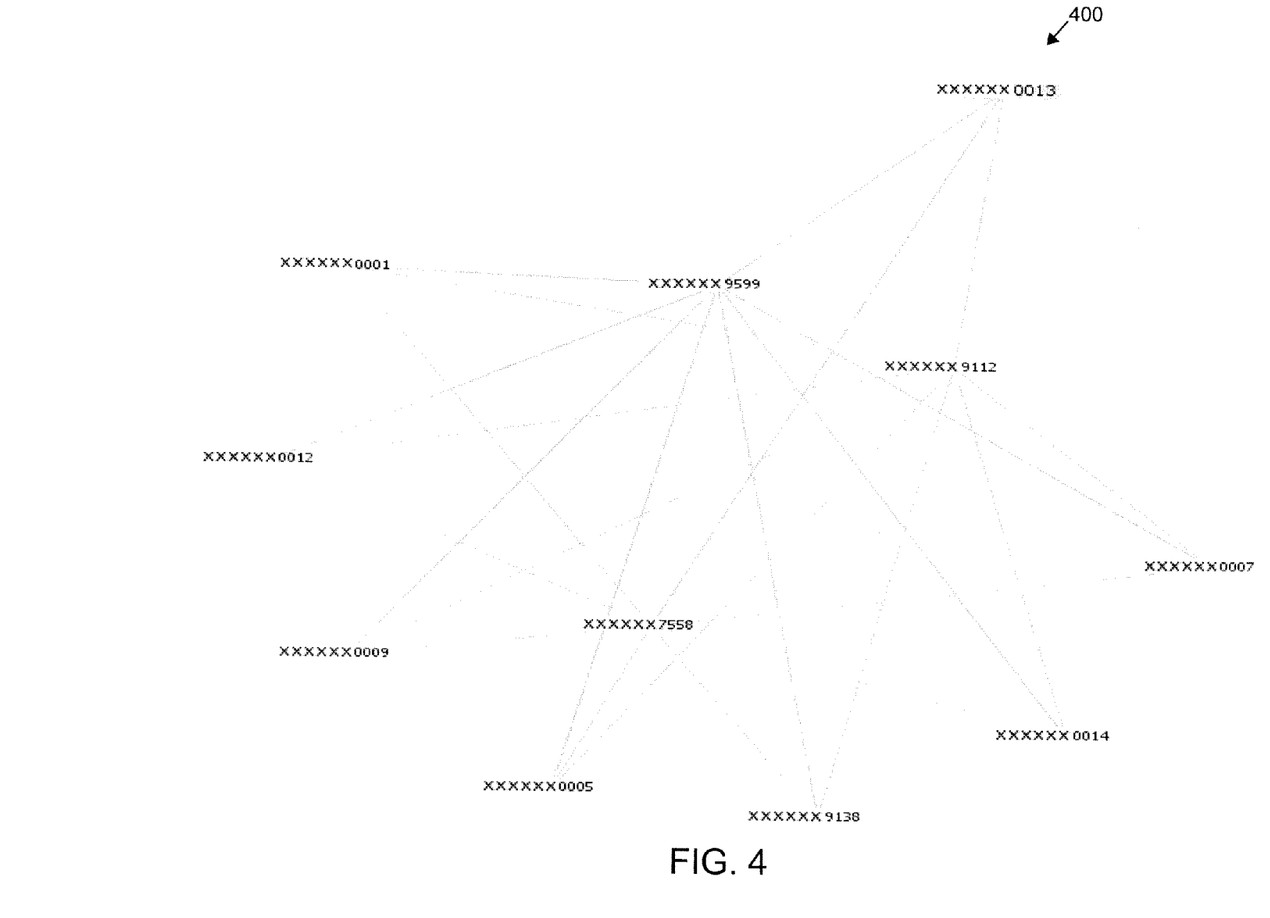
FIG. 4 is an exemplary undirected graph illustrating at least one node with a relatively high associated closeness centrality parameter value.

Referring to FIG. 4, an exemplary undirected graph 400 is shown wherein the XXXXXX0013 node has the highest closeness centrality parameter value among all the nodes. The XXXXXX0013 node has only 3 neighbors and has a relatively larger distance to other nodes and, therefore, has relatively high associated closeness parameter value. It should be evident that the closeness centrality parameter value, or any other centrality parameter value, can be calculated as an inverse in which case, the XXXXXX0013 node would have a relatively low associated closeness parameter value.

The value of the degree centrality parameter (d) for each node of a network is a measure of the number of connections a node has with its neighbors. Accordingly, in one example, the value of the degree centrality parameter is determined based on the number of nodes in its neighborhood, such as the number of friends or followers of a member of a social network, for example.

The value of the clustering coefficient parameter (cc) for each node of a network is a measure of how close the neighbors of a node are to forming a clique or complete graph or the likelihood that two associates of a node are associates themselves. Accordingly, a relatively high clustering coefficient centrality parameter value indicates that all the neighbors are connected, or nearly connected, by every possible edge between them.

In one example, the clustering coefficient centrality parameter (cc) for a vertex v or node is determined based on the ratio of the total connections between the vertices within its neighborhood, or direct connections, and the maximum number of links that could possibly exist between them: $cc(v)=|\{e_{jk}\}|/k_i(k_i-1)$, where $k_i$ represents the number of immediate neighbors of vertex v, $e_{jk} \in E$, and $v_i$ and $v_j$ are immediate neighbors of vertex v.

Figure 5:
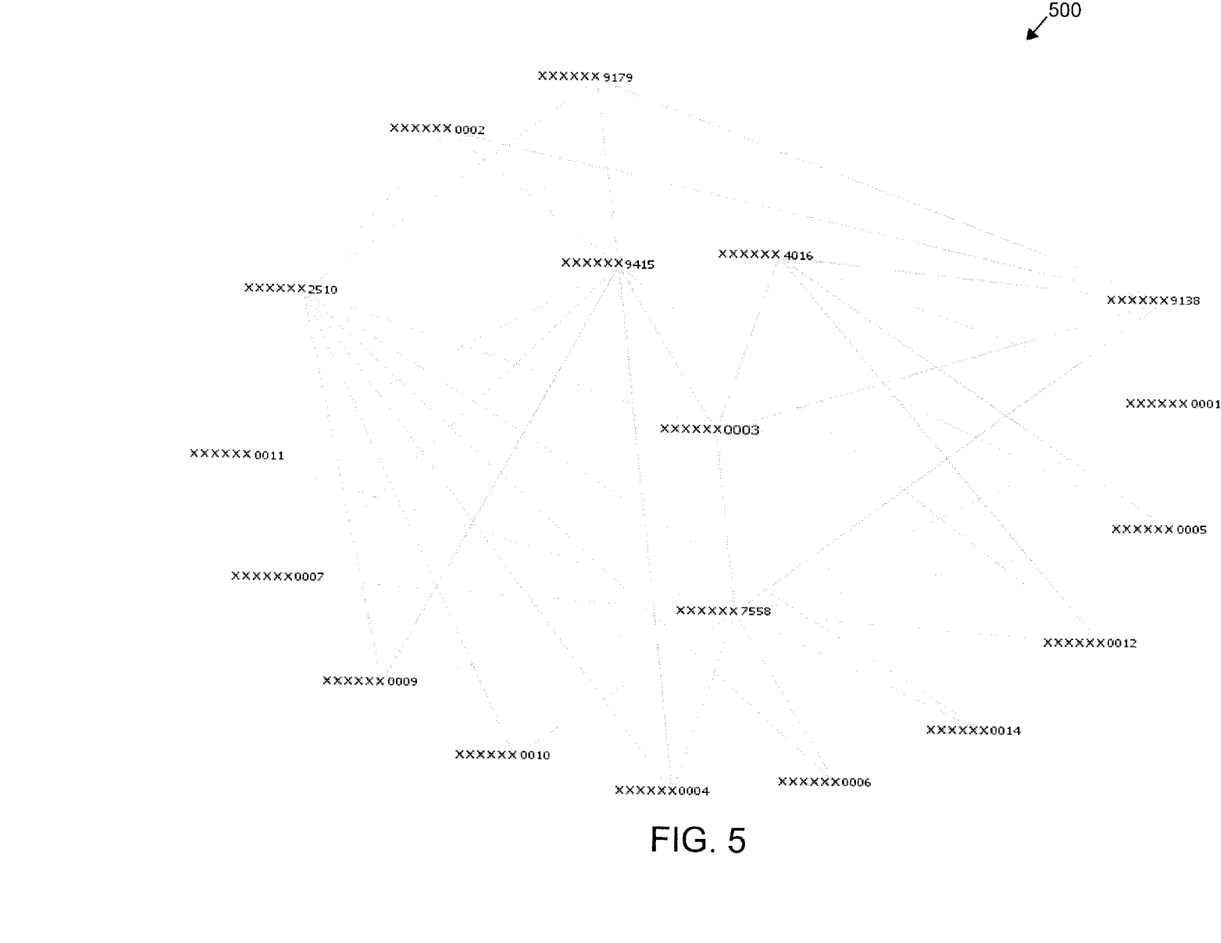
FIG. 5 is an exemplary undirected graph illustrating at least one node with a relatively high associated clustering coefficient centrality parameter value.

Referring to FIG. 5, an exemplary undirected graph 500 is shown wherein the XXXXXX0003 node has the highest clustering coefficient centrality parameter value among all the nodes. The XXXXXX0003 node has five neighbors, several of which have edges between them so as to form a structure close to a clique or ring.

The value of the eccentricity centrality parameter (ecc) for each node of a network is a measure of the maximum shortest path length that is possible from a vertex v or node to all its reachable vertices in the network or how far a node is from the node most distant from it in the network. A maximum shortest path of a node n is a shortest path from n to a node reachable from it that has the largest length among all shortest paths from n to its reachable nodes. The value of the eccentricity centrality parameter is of a node n is, therefore, the length of its maximum shortest path(s): $ecc(v)=max(\sigma_{st})$, where $\sigma_{st}$ is the number of shortest paths from s to t. Accordingly, a lower eccentricity value may indicate a node is relatively spaced apart from other nodes and may have a lower significance or influencing power.

Referring back to FIG. 2, in step 204 the network topology discovery and analyzing computing apparatus 50 optionally stores one or more of the centrality parameter values, determined at step 202, in memory 40 as associated with each respective node.

In step 206, the network topology discovery and analyzing computing apparatus 50 generates at least one topology score for each of the plurality of nodes of the network based on one or more of the centrality parameter values. Exemplary topology scores include a star topology score, a ring topology score, and a mesh topology score, although other topology scores may be generated.

A star topology has as its center a node with very high connectivity and such topologies are therefore useful in identifying relatively significant nodes. In on example of a social network, the relatively significant nodes may represent likely influencers who are more likely to be able to motivate a larger number of other network members and, therefore, may be relatively effective choices for directing the advertising of new products or services, for example.

In one example, a star topology score is generated, at step 206, based on the following formula: $\log((\alpha_b+b)\times(\alpha_d+d)\times(\alpha_{cl}+cl)\times(\alpha_{cc}+(1-cc^2)))$, where b, d, cl, and cc are the betweenness, degree, closeness, and clustering coefficient centrality parameter values determined at step 202, respectively, and $\alpha_b$, $\alpha_d$, $\alpha_{cl}$, and $\alpha_{cc}$ are betweenness, degree, closeness, and clustering coefficient weight values, respectively. Accordingly, the star topology score is directly proportional to the betweenness centrality parameter value, degree centrality parameter value, closeness centrality parameter value, and one minus the square of the clustering coefficient centrality parameter value, thereby more heavily weighting the clustering coefficient centrality parameter. In order to normalize the star topology score, as well as each of the centrality parameter values, an optional logarithm function is optionally utilized along with the optional weight values.

Figure 6A:
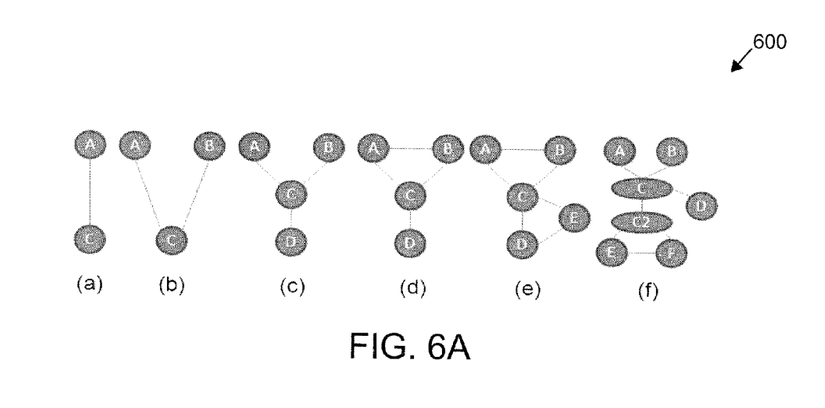
FIG. 6A is a set of exemplary undirected graphs.
Figure 6B:
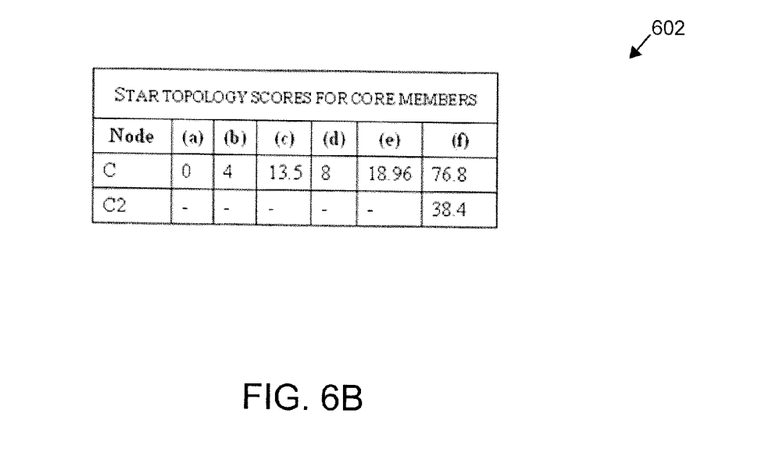
FIG. 6B is a table of exemplary star topology scores for at least one node for each of the set of exemplary undirected graphs of FIG. 6A.

Referring to FIG. 6A, a set of exemplary undirected graphs 600 is shown. Referring to FIG. 6B, a table of exemplary star topology scores 602 for at least one node for each graph of the set of exemplary undirected graphs 600 of FIG. 6A is shown. FIGS. 6A and 6B illustrate the change in star topology scores resulting from an addition of random edges and nodes. The presence of an additional edge in graph (d) of the set of graphs 600 results in a lower star topology score (8) for node C as compared to the star topology score for node C (13.5) in graph (c) due at least in part to the value of the clustering coefficient centrality parameter associated with node C in each graph. Accordingly, the significance of node C is relatively high in graph (d) as compared to the significant of node C in graph (c) due to the edge connecting nodes A and B in graph (d) which provides an additional path, other than from node C, for communication between those nodes. In one example of a social network, node C's ability to influence both node A and node B is reduced in graph (d) since nodes A and B can also be influenced by each other in contrast to the network set forth in graph C. In another example, the addition of node E in graph (e) results in a higher star topology score associated with node C (18.96) due to the ability of node C to influence more members of the network. In yet another example, the star topology score for node C (76.8) is higher than the star topology scores of node C2 (38.4) in graph (f) because node C is part of two star-like network (A-B-C-D and A-B-C-C2) and, therefore, more likely to be able to influence more members of the network.

In one example, a ring topology score is generated, alone or in combination with a star topology score, at step 206, based on the following formula: $\log((\beta_{ecc}+ecc)\times(\beta_{cl}+cl)\times(\beta_d+d^2))$, where ecc, cl, and d are the eccentricity, closeness, and degree centrality parameter values, respectively, and $\beta_{ecc}$, $\beta_{cl}$, and $\beta_d$ are eccentricity, closeness, and degree weight values, respectively. Accordingly, the star topology score is directly proportional to the eccentricity centrality parameter value, the closeness centrality parameter value, and the square of the degree parameter value, thereby more heavily weighting the degree centrality parameter. In order to normalize the ring topology score, as well as each of the centrality parameter values, an optional logarithm function is optionally utilized along with the optional weight values.

Figure 7A:
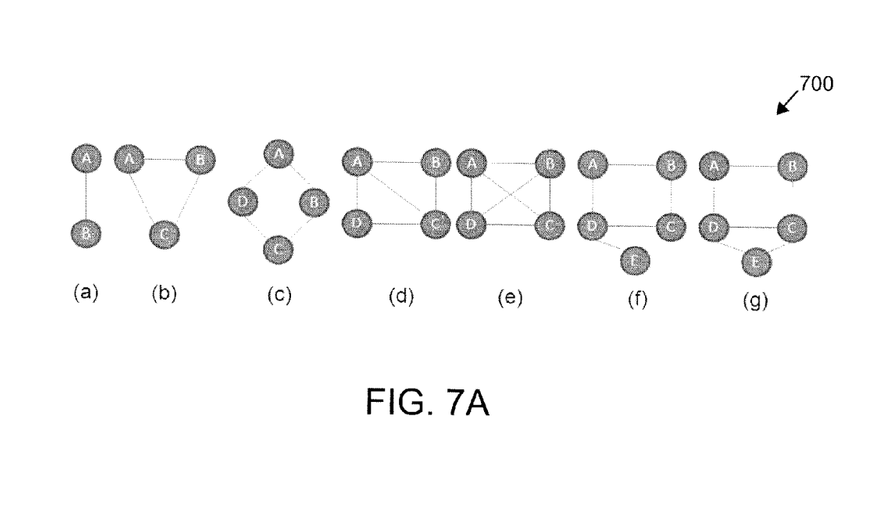
FIG. 7A is a set of exemplary undirected graphs.
Figure 7B:
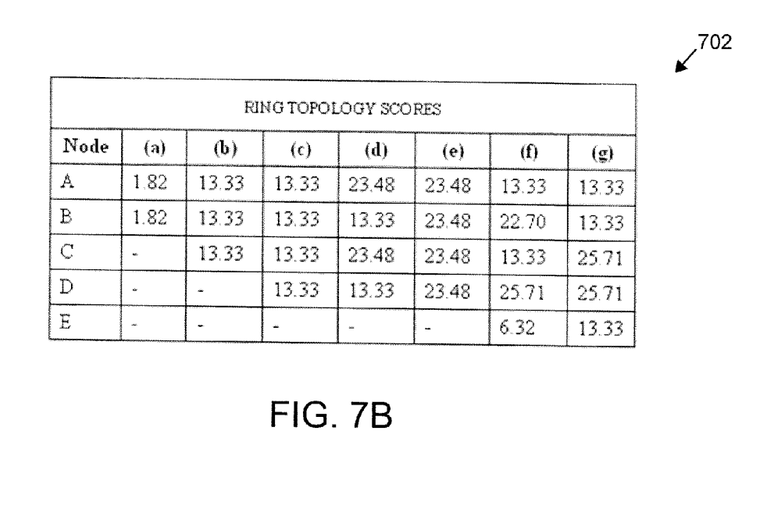
FIG. 7B is a table of exemplary ring topology scores for at least one node for each of the set of exemplary undirected graphs of FIG. 6A.

Referring to FIG. 7A, a set of exemplary undirected graphs 700 is shown. Referring to FIG. 7B, a table of exemplary ring topology scores 702 for each of the nodes of each graph of the set of exemplary undirected graphs 700 of FIG. 7A is shown. FIGS. 7A and 7B illustrate the change in ring topology scores resulting from an addition of random edges and nodes. As illustrated by graphs (d), (f), and (g), those nodes with relatively high ring topology scores are the nodes which have an increased number of edges in common with nodes from the same ring as compared to their neighbors. In the exemplary graph (d), nodes A and C have a higher ring topology scores (23.48) than nodes B and C (13.33) because each has three edges connecting nodes of the same ring as compared to the two edges of nodes B and D. In the exemplary graphs (f) and (g), node D has the highest associated ring topology score (25.71) because node D is almost part of two rings in graph (f) and, in graph (g), node D is part of two rings as the edge connecting nodes C and E is present. Accordingly, in a social network, for example, the ring topology score for nodes representing members of the network can represent significant members that connect multiple groups of members and, therefore, are more likely to be able to influence an increased number of groups of members, potentially with distinct characteristics. Additionally, removal of those nodes having a relatively high associated ring topology score is likely to more substantially reduce information flow among the nodes of the network.

In one example, a mesh topology score is generated, alone or in combination with a star topology score and/or a ring topology score, at step 206, based on the following formula: $\log(((\gamma_{cc}+cc)\times(\gamma_d+d^2)\times(\gamma_{cl}+cl))/(ecc^2+\gamma_{ecc}))$, where cc, d, cl, and ee are the clustering coefficient, degree, closeness, and eccentricity centrality parameter values, respectively, and $\gamma_{cc}$, $\gamma_d$, $\gamma_{cl}$, and $\gamma_{ecc}$, are clustering coefficient, degree, closeness, and eccentricity weight values, respectively. Accordingly, the mesh topology score is directly proportional to the cluster coefficient centrality parameter value and the closeness centrality parameter value and inversely proportional to the eccentricity centrality parameter value. In order to normalize the mesh topology score, as well as each of the centrality parameter values, an optional logarithm function is optionally utilized along with the optional weight values.

Figure 8A:
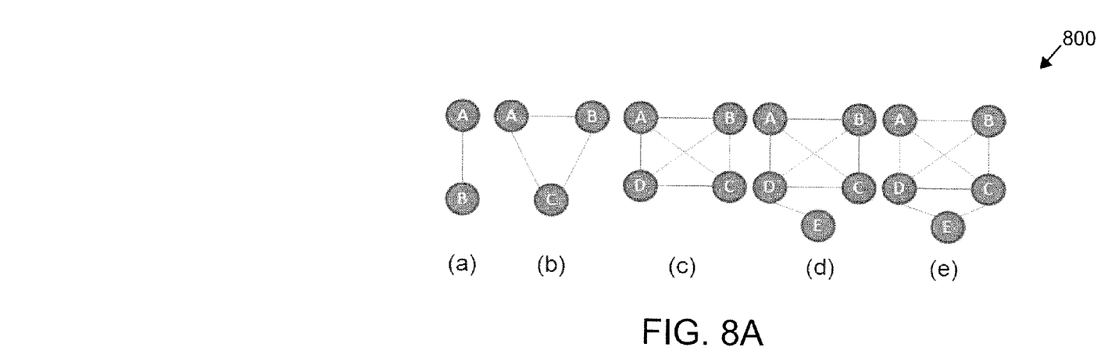
FIG. 8A is a set of exemplary undirected graphs.
Figure 8B:
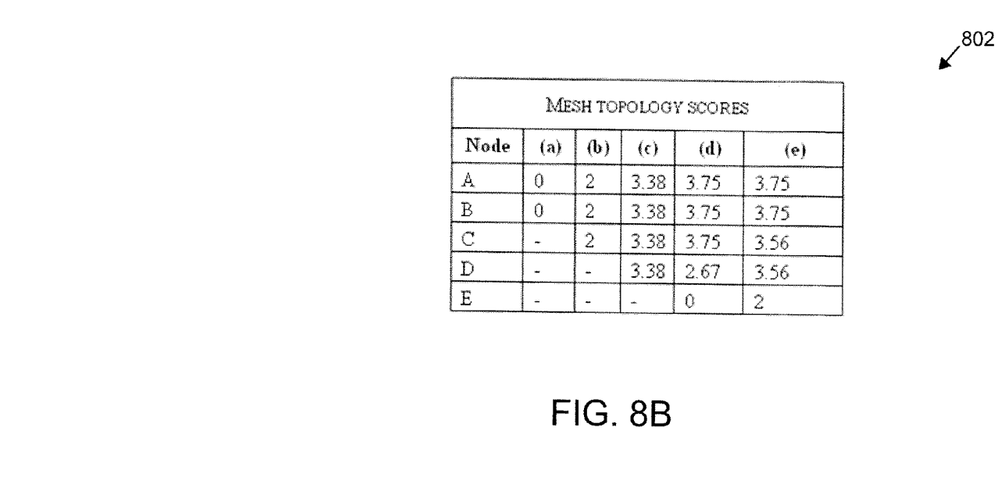
FIG. 8B is a table of exemplary mesh topology scores for at least one node for each of the set of exemplary undirected graphs of FIG. 6A.

Referring to FIG. 8A, a set of exemplary undirected graphs 800 is shown. Referring to FIG. 8B, a table of exemplary mesh topology scores 802 for each of the nodes of each graph of the set of exemplary undirected graphs 800 of FIG. 8A is shown. FIGS. 8A and 8B illustrate the change in mesh topology scores resulting from an addition of random edges and nodes. For example, in graph (d), the node D has the lowest associated mesh topology score (2.67) because it is the least fully connected to the perfect, fully connected, mesh component A-B-C-D, of any node connected to more than one other node, due to its additional connection to node E. Accordingly, nodes A, B, and C are more likely to be influential with respect to the shared group of nodes A-B-C-D as compared to node D which may also be sharing its resources or knowledge with node E, which is not part of the A-B-C-D group. Similarly, nodes C and D in graph (e) have a lower associated mesh topology score (3.56) than nodes A and B (3.75) because they each share an additional connection with node E and are therefore less fully connected to the shared A-B-C-D group. While node E is also part of a perfect, fully connected, mesh component C-D-E, this component is smaller in terms of number of nodes and, therefore, node E has a lower mesh topology score (2) as compared to that of nodes A and B (3.75), for example. Accordingly, in a social network, for example, the mesh topology score for nodes representing members of the network can represent significant members that connect other members of a group and are more likely to be able to influence other members of a shared group.

In step 208, the network topology discovery and analyzing computing apparatus 50, identifies and outputs one or more relatively significant nodes based on one or more of the topology scores. By way of example only, the network topology discovery and analyzing computing apparatus 50 can output the identified significant nodes to memory for storage for later use or to an executing application which can utilize the identified one or more relatively significant nodes.

Figure 9A:
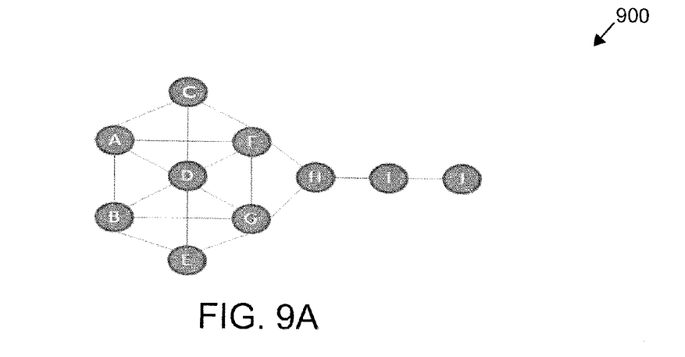
FIG. 9A is an exemplary undirected graph.
Figure 9B:
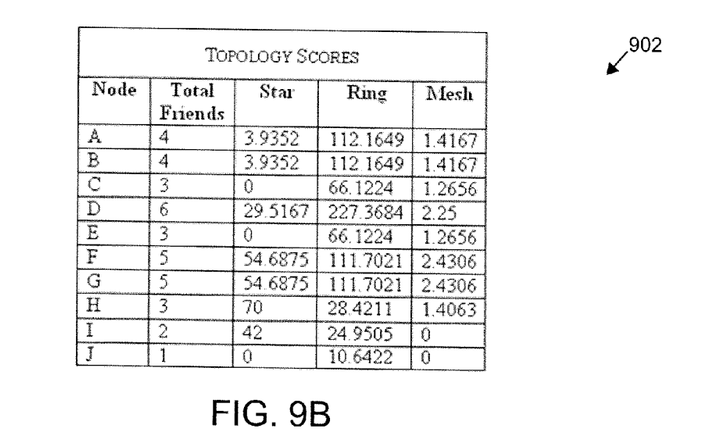
FIG. 9B is a table of exemplary star, ring, and mesh topology scores for each node of the exemplary undirected graph of FIG. 9A.

Referring to FIGS. 9A and 9B, an exemplary undirected graph 900 and a table of exemplary star, ring, and mesh topology scores 902 for each node of the exemplary undirected graph 900 of FIG. 9A are shown, respectively. In one example, the graph 900 is representative of a social network, the vertices or nodes are representative of members of the social network, and each edge connecting nodes is representative of an association or friendship of the two connected members represented by the connected nodes. The non-normalized star, ring, and mesh topology scores each indicate one or more characteristics of the exemplary network and/or members of the network including those relatively significant members such as those members that are relatively significant due to a relative influential ability with respect to other nodes, which may be useful for purposes of more effectively directing advertising, for example.

In one example in step 208, the star topology scores are ranked to identify one or more members likely to be relatively influential with respect to one or more other members. A ranking of the star topology scores in the table 902 indicates that member H of the graph 900 is likely the most significant and/or influential member due to member H's neighbors being less connected among themselves when compared to all the other members in the graph 900 or network. Accordingly, while member D is the center of a star-like component of the graph 900, member D's neighbors are relatively well connected and member D's significance and/or influence is relatively low, particularly as compared to that of member H, and the star topology score associated with member D is reflective of such relative significance.

In another example in step 208, the ring topology scores are ranked to identify one or more members likely to be relatively influential with an increased number of groups of members. A ranking of the ring topology scores in the table 902 indicates that member D of the graph 900 is likely the most significant and/or influential member with respect to inclusion in a relatively large number of rings or groups and associated relatively high disruptive effect of removing member D from the network.

In another example in step 208, the mesh topology scores are ranked, in step 208, to identify one or more nodes likely to be relatively influential with respect to other members of a shared group. A ranking of the mesh topology scores in the table 902 indicates that members F and G of the graph 900 are likely the most significant and/or influential members with respect to other members of any of their shared groups as the neighbors of members F and G have more edges between them than the neighbors of any other member. While the mesh topology score for member D (2.25) is the second-highest among the members, it is lower than that of members F and G (2.4306) because more of member D's neighbors are not connected to each other (e.g. A and E, E and F, C and B, C and G, F and B, and A and G) than member F's neighbors for example (C and G, D and H, A and G, A and H, and C and H).

While the topology scores identified above, along or in combination, are useful in resolving certain queries with respect to a network, other topology scores can also be calculated. In an example in which the centrality parameter values are stored in step 204, one or more topology scores can be calculated at any time without traversing all of the network relationships.

In one example, the centrality parameter values are updated based on a time interval and/or when one or more changes in the relationship information of the network (e.g. addition or removal of a node and/or addition or removal of a connection among nodes) are identified, for example, such as by a modification of one or more records associated with one or more nodes at the database servers 32(1)-32(n). Optionally, the database servers 32(1)-32(n) can maintain a log of changes since the last transfer of relationship information to the network topology discovery and analyzing computing apparatus 50, at step 200, and/or the network topology discovery and analyzing computing apparatus 50 can compare the membership and/or relationship information for each subsequent dataset obtained at step 200 in order to identify any changes. In another example, one or more of the centrality parameter values are only recalculated for one or more nodes when the network topology discovery and analyzing computing apparatus determines that an identified change in the membership or connections could have an effect on those values. Thereby, only those nodes with a centrality parameter value modified by the change in membership will be updated reducing the computational expense of the network topology analysis.

Accordingly, as illustrated and described with the examples herein this technology provides more effective methods and devices for analyzing network topologies to identify one or more significant nodes, the significance being based on the query parameters and requested characteristics of the topology. One such business query resolved by the technology described herein is where or to whom in a social network advertising is more efficiently directed and/or who in a social network is more likely to influence other members generally, other groups of members, or other members of shared group, for example. The technology provides an anonymous process of identifying significant members of a network as well as methods and devices for efficient updating of the various centrality parameter values and associated topology scores used by the network analyzing computing apparatus 50 and, thereby, the efficiency and quality of network topology analysis is improved.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for discovering and analyzing a network topology, the method comprising:

obtaining, by a network topology discovery and analyzing computing apparatus, information regarding a network including a relationship of a plurality of nodes of the network;

determining, by the network topology discovery and analyzing computing apparatus, a value for each of at least three of a plurality of centrality parameters for each of the plurality of nodes, wherein the plurality of centrality parameters comprise betweenness, closeness, degree, clustering coefficient, or eccentricity;

generating, by the network topology discovery and analyzing computing apparatus, at least one topology score for each of the plurality of nodes based on the centrality parameter values;

identifying, by the network topology discovery and analyzing computing apparatus, one or more relatively significant nodes based on one or more of the topology scores; and outputting, by the network topology discovery and analyzing computing apparatus, the identified one or more relatively significant nodes.

2. The method as set forth in claim 1 wherein the information regarding the network includes an identifier for each of the plurality of nodes without any private information associated with the node.

3. The method as set forth in claim 1 wherein the topology score comprises one or more of a star topology score, a ring topology score, or a mesh topology score.

4. The method as set forth in claim 3 wherein the one or more relatively significant nodes are relatively significant due to a relative influential ability and wherein the identifying further comprises one or more of ranking the star topology scores to identify one or more nodes likely to be relatively influential with respect to one or more other nodes, ranking the ring network scores to identify one or more nodes likely to be relatively influential with an increased number of groups of nodes, or ranking the mesh topology scores to identify one or more nodes likely to be relatively influential with respect to other members of a shared group.

5. The method as set forth in claim 1 wherein at least one of the centrality parameters comprise betweenness, degree, closeness, and clustering coefficient and the topology score comprises a star topology score, the centrality parameters comprise eccentricity, closeness, and degree and the topology score comprises a ring topology score, or the centrality parameters comprise clustering coefficient, degree, closeness, and eccentricity and the topology score comprises a mesh topology score.

6. The method as set forth in claim 1 wherein the closeness centrality parameter value is determined based on a mean geodesic distance between one of the plurality of nodes and each other of the plurality of nodes reachable by the one of the plurality of nodes and the eccentricity centrality parameter value is determined based on a maximum length of a shortest one of a plurality of paths between one of the plurality of nodes and each other of the plurality of nodes reachable by the one of the plurality of nodes.

7. A method for discovering and analyzing a network topology, the method comprising:

obtaining, by a network topology discovery and analyzing computing apparatus, information regarding a network including a relationship of a plurality of nodes of the network, wherein the information regarding the network includes an identifier for each of the plurality of nodes without any private information associated with the node;

determining, by the network topology discovery and analyzing computing apparatus, a value for each of a plurality of centrality parameters for each of the plurality of nodes, wherein the plurality of centrality parameters comprise betweenness, closeness, degree, clustering coefficient, or eccentricity;

generating, by the network topology discovery and analyzing computing apparatus, at least one topology score for each of the plurality of nodes based on one or more of the centrality parameter values, the topology score comprising one or more of a star topology score, a ring topology score, or a mesh topology score, wherein the generating at least one topology score further comprises generating at least one of:

the star topology score based on the formula $\log((\alpha b+b) \times (\alpha d+d) \times (\alpha cl+cl) \times (\alpha cc+(1-cc2)))$, wherein b, d, cl, and cc are the betweenness, degree, closeness and clustering coefficient centrality parameter values, respectively, and $\alpha b$, $\alpha d$, $\alpha cl$, and $\alpha cc$ are betweenness, degree, closeness, and clustering coefficient weight values, respectively;

the ring topology score based on the formula $\log((\beta ecc+ecc) \times (\beta cl+cl) \times (\beta d+d2))$, wherein ecc, cl, and d are the eccentricity, closeness, and degree centrality parameter values, respectively, and $\beta ecc$, $\beta cl$, and $\beta d$ are eccentricity, closeness, and degree weight values, respectively; or the mesh topology score based on the formula $\log(((\gamma cc+cc) \times (\gamma d+d2) \times (\gamma cl+cl))/(ecc2+\gamma ecc))$, wherein cc, d, cl, and ecc are the clustering coefficient, degree, closeness, and eccentricity centrality parameter values, respectively, and $\gamma cc$, $\gamma d$, $\gamma cl$, and $\gamma ecc$, are clustering coefficient, degree, closeness, and eccentricity weight values, respectively;

identifying, by the network topology discovery and analyzing computing apparatus, one or more relatively significant nodes based on one or more of the topology scores; and outputting, by the network topology discovery and analyzing computing apparatus, the identified one or more relatively significant nodes, wherein the one or more relatively significant nodes are relatively significant due to a relative influential ability and wherein the identifying further comprises one or more of ranking the star topology scores to identify one or more nodes likely to be relatively influential with respect to one or more other nodes, ranking the ring network scores to identify one or more nodes likely to be relatively influential with an increased number of groups of nodes, or ranking the mesh topology scores to identify one or more nodes likely to be relatively influential with respect to other members of a shared group.

8. A method for discovering and analyzing a network topology, the method comprising:

obtaining, at a network topology discovery and analyzing computing apparatus, information regarding a network including a relationship of a plurality of nodes of the network;

determining, with the network topology discovery and analyzing computing apparatus, a value for each of a plurality of centrality parameters for each of the plurality of nodes;

generating, with the network topology discovery and analyzing computing apparatus, at least one topology score for each of the plurality of nodes based on one or more of the centrality parameter values;

identifying, with the network topology discovery and analyzing computing apparatus, one or more relatively significant nodes based on one or more of the topology scores;

outputting, with the network topology discovery and analyzing computing apparatus, the identified one or more relatively significant nodes;

prior to generating at least one topology score, storing, at the network topology discovery and analyzing computing apparatus, the value for each of the plurality of centrality parameters as associated with each of the respective nodes;

identifying, with the network topology discovery and analyzing computing apparatus, one or more changes to the relationship information; and updating, with the network topology discovery and analyzing computing apparatus, only one or more of the centrality parameter values associated with those nodes affected by the one or more changes to the relationship information.

9. A non-transitory computer readable medium having stored thereon instructions for discovering and analyzing a network topology comprising machine executable code which when executed by at least one processor, causes the processor to perform steps comprising:

obtaining information regarding a network including a relationship of a plurality of nodes of the network;

determining at least one value for each of at least three of a plurality of centrality parameters for each of the plurality of nodes, wherein the plurality of centrality parameters comprise betweenness, closeness, degree, clustering coefficient, or eccentricity;

generating at least one topology score for each of the plurality of nodes based the centrality parameter values;

identifying one or more relatively significant nodes based on one or more of the topology scores; and outputting the identified one or more relatively significant nodes.

10. The medium as set forth in claim 9 wherein the information regarding the network includes an identifier for each of the plurality of nodes without any private information associated with the node.

11. The medium as set forth in claim 9 wherein the topology score comprises one or more of a star topology score, a ring topology score, or a mesh topology score.

12. The medium as set forth in claim 11 wherein the one or more relatively significant nodes are relatively significant due to a relative influential ability and wherein the identifying further comprises one or more of ranking the star topology scores to identify one or more nodes likely to be relatively influential with respect to one or more other nodes, ranking the ring network scores to identify one or more nodes likely to be relatively influential with an increased number of groups of nodes, or ranking the mesh topology scores to identify one or more nodes likely to be relatively influential with respect to other members of a shared group.

13. The medium as set forth in claim 9 wherein at least one of the centrality parameters comprise betweenness, degree, closeness, and clustering coefficient and the topology score comprises a star topology score, the centrality parameters comprise eccentricity, closeness, and degree and the topology score comprises a ring topology score, or the centrality parameters comprise clustering coefficient, degree, closeness, and eccentricity and the topology score comprises a mesh topology score.

14. The medium as set forth in claim 9 wherein the closeness centrality parameter value is determined based on a mean geodesic distance between one of the plurality of nodes and each other of the plurality of nodes reachable by the one of the plurality of nodes and the eccentricity centrality parameter value is determined based on a maximum length of a shortest one of a plurality of paths between one of the plurality of nodes and each other of the plurality of nodes reachable by the one of the plurality of nodes.

15. A non-transitory computer readable medium having stored thereon instructions for discovering and analyzing a network topology comprising machine executable code which when executed by at least one processor, causes the processor to perform steps comprising:

obtaining information regarding a network including a relationship of a plurality of nodes of the network, wherein the information regarding the network includes an identifier for each of the plurality of nodes without any private information associated with the node;

determining at least one value for each of a plurality of centrality parameters for each of the plurality of nodes, wherein the plurality of centrality parameters comprise betweenness, closeness, degree, clustering coefficient, or eccentricity;

generating at least one topology score for each of the plurality of nodes based on one or more of the centrality parameter values, the topology score comprising one or more of a star topology score, a ring topology score, or a mesh topology score, wherein the generating at least one topology score further comprises generating at least one of:

the star topology score based on the formula $\log((\alpha b+b)\times(\alpha d+d)\times(\alpha cl+cl)\times(\alpha cc+(1-cc2)))$, wherein b, d, cl, and cc are the betweenness, degree, closeness and clustering coefficient centrality parameter values, respectively, and $\alpha b$, $\alpha d$, $\alpha cl$, and $\alpha cc$ are betweenness, degree, closeness, and clustering coefficient weight values, respectively;

the ring topology score based on the formula $\log((\beta ecc+ecc)\times(\beta cl+cl)\times(\beta d+d2))$, wherein ecc, cl, and are the eccentricity, closeness, and degree centrality parameter values, respectively, and $\beta ecc$, $\beta cl$, and $\beta d$ are eccentricity, closeness, and degree weight values, respectively; or the mesh topology score based on the formula $\log(((\gamma cc+cc)\times(\gamma d+d2)\times(\gamma cl+cl))/(ecc2+\gamma ecc))$, wherein cc, d, cl, and ecc are the clustering coefficient, degree, closeness, and eccentricity centrality parameter values, respectively, and $\gamma cc$, $\gamma d$, $\gamma cl$, and $\gamma ecc$, are clustering coefficient, degree, closeness, and eccentricity weight values, respectively;

identifying one or more relatively significant nodes based on one or more of the topology scores; and outputting the identified one or more relatively significant nodes, wherein the one or more relatively significant nodes are relatively significant due to a relative influential ability and wherein the identifying further comprises one or more of ranking the star topology scores to identify one or more nodes likely to be relatively influential with respect to one or more other nodes, ranking the ring network scores to identify one or more nodes likely to be relatively influential with an increased number of groups of nodes, or ranking the mesh topology scores to identify one or more nodes likely to be relatively influential with respect to other members of a shared group.

16. A non-transitory computer readable medium having stored thereon instructions for discovering and analyzing a network topology comprising machine executable code which when executed by at least one processor, causes the processor to perform steps comprising:
obtaining information regarding a network including a relationship of a plurality of nodes of the network;
determining at least one value for each of a plurality of centrality parameters for each of the plurality of nodes;
generating at least one topology score for each of the plurality of nodes based on one or more of the centrality parameter values;
identifying one or more relatively significant nodes based on one or more of the topology scores;
outputting the identified one or more relatively significant nodes;
prior to generating at least one topology score, storing the value for each of the plurality of centrality parameters as associated with each of the respective nodes;
identifying one or more changes to the relationship information;
updating only one or more of the centrality parameter values associated with those nodes affected by the one or more changes to the relationship information; and
outputting the identified one or more relatively significant nodes.

17. A network topology discovery and analyzing computing apparatus, comprising:
one or more processors; and
a memory coupled to the one or more processors which are configured to execute programmed instructions stored in the memory comprising:
obtaining information regarding a network including a relationship of a plurality of nodes of the network;
determining at least one value for each of at least three of a plurality of centrality parameters for each of the plurality of nodes, wherein the plurality of centrality parameters comprise betweenness, closeness, degree, clustering coefficient, or eccentricity;
generating at least one topology score for each of the plurality of nodes based on the centrality parameter values;
identifying one or more relatively significant nodes based on one or more of the topology scores.

18. The apparatus as set forth in claim 17 wherein the information regarding the network includes an identifier for each of the plurality of nodes without any private information associated with the node.

19. The apparatus as set forth in claim 17 wherein the topology score comprise one or more of a star topology score, a ring topology score, or a mesh topology score.

20. The apparatus as set forth in claim 19 wherein the one or more relatively significant nodes are relatively significant due to a relative influential ability and wherein the identifying further comprises one or more of ranking the star topology scores to identify one or more nodes likely to be relatively influential with respect to one or more other nodes, ranking the ring network scores to identify one or more nodes likely to be relatively influential with an increased number of groups of nodes, or ranking the mesh topology scores to identify one or more nodes likely to be relatively influential with respect to other members of a shared group.

21. The apparatus as set forth in claim 17 wherein at least one of the centrality parameters comprise betweenness, degree, closeness, and clustering coefficient and the topology score comprises a star topology score, the centrality parameters comprise eccentricity, closeness, and degree and the topology score comprises a ring topology score, or the centrality parameters comprise clustering coefficient, degree, closeness, and eccentricity and the topology score comprises a mesh topology score.

22. The apparatus as set forth in claim 17 wherein the closeness centrality parameter value is determined based on a mean geodesic distance between one of the plurality of nodes and each other of the plurality of nodes reachable by the one of the plurality of nodes and the eccentricity centrality parameter value is determined based on a maximum length of a shortest one of a plurality of paths between one of the plurality of nodes and each other of the plurality of nodes reachable by the one of the plurality of nodes.

23. A network topology discovery and analyzing computing apparatus comprising:
one or more processors; and
a memory coupled to the one or more processors which are configured to execute programmed instructions stored in the memory comprising:
obtaining information regarding a network including a relationship of a plurality of nodes of the network, wherein the information regarding the network includes an identifier for each of the plurality of nodes without any private information associated with the node;
determining at least one value for each of a plurality of centrality parameters for each of the plurality of nodes, wherein the plurality of centrality parameters comprise betweenness, closeness, degree, clustering coefficient, or eccentricity;
generating at least one topology score for each of the plurality of nodes based on one or more of the centrality parameter values, the topology score comprising one or more of a star topology score, a ring topology score, or a mesh topology score, wherein the generating at least one topology score further comprises generating at least one of:
the star topology score based on the formula $\log((\alpha b+b) \times (\alpha d+d) \times (\alpha cl+cl) \times (\alpha cc+(1-cc2)))$, wherein b, d, cl, and cc are the betweenness, degree, closeness and clustering coefficient centrality parameter values, respectively, and $\alpha b$, $\alpha d$, $\alpha cl$, and $\alpha cc$ are betweenness, degree, closeness, and clustering coefficient weight values, respectively;
the ring topology score based on the formula $\log((\beta ecc+ecc) \times (\beta cl+cl) \times (\beta d+d2))$, wherein ecc, cl, and d are the eccentricity, closeness, and degree centrality parameter values, respectively, and $\beta ecc$, $\beta cl$, and $\beta d$ are eccentricity, closeness, and degree weight values, respectively; or
the mesh topology score based on the formula $\log(((\gamma cc+cc) \times (\gamma d+d2) \times (\gamma cl+cl))/(ecc2+\gamma ecc))$, wherein cc, d, cl, and ecc are the clustering coefficient, degree, closeness, and eccentricity centrality parameter values, respectively, and $\gamma cc$, $\gamma d$, $\gamma cl$, and $\gamma ecc$, are clustering coefficient, degree, closeness, and eccentricity weight values, respectively; and
identifying one or more relatively significant nodes based on one or more of the topology scores, wherein the one or more relatively significant nodes are relatively significant due to a relative influential ability and wherein the identifying further comprises one or more of ranking the star topology scores to identify one or more nodes likely to be relatively influential with respect to one or more other nodes, ranking the ring network scores to identify one or more nodes likely to be relatively influential with an increased number of groups of nodes, or ranking the mesh topology scores to identify one or more nodes likely to be relatively influential with respect to other members of a shared group.

24. A network topology discovery and analyzing computing apparatus, comprising:

one or more processors; and a memory coupled to the one or more processors which are configured to execute programmed instructions stored in the memory comprising:

obtaining information regarding a network including a relationship of a plurality of nodes of the network;

determining at least one value for each of a plurality of centrality parameters for each of the plurality of nodes;

generating at least one topology score for each of the plurality of nodes based on one or more of the centrality parameter values;

identifying one or more relatively significant nodes based on one or more of the topology scores; and outputting the identified one or more relatively significant nodes prior to generating at least one topology score, storing the value for each of the plurality of centrality parameters as associated with each of the respective nodes;

identifying one or more changes to the relationship information; and updating only one or more of the centrality parameter values associated with those nodes affected by the one or more changes to the relationship information.

* * * * *